US011691539B2

(12) United States Patent
Southwood et al.

(10) Patent No.: US 11,691,539 B2
(45) Date of Patent: Jul. 4, 2023

(54) FOLDING SEAT CLAMP

(71) Applicant: MacLean-Fogg Company, Mundelein, IL (US)

(72) Inventors: Bradley Warren Southwood, Royal Oak, MI (US); Aaron Jay Longstreet, Sterling Heights, MI (US)

(73) Assignee: MACLEAN-FOGG COMPANY, Mundelein, IL (US)

( * ) Notice: Subject to any disclaimer, the term of this patent is extended or adjusted under 35 U.S.C. 154(b) by 0 days.

(21) Appl. No.: 17/360,698

(22) Filed: Jun. 28, 2021

(65) Prior Publication Data

US 2022/0009380 A1     Jan. 13, 2022

Related U.S. Application Data

(60) Provisional application No. 63/044,774, filed on Jun. 26, 2020.

(51) Int. Cl.
*B60N 2/015* (2006.01)
*B60N 2/30* (2006.01)

(52) U.S. Cl.
CPC ............... *B60N 2/015* (2013.01); *B60N 2/30* (2013.01)

(58) Field of Classification Search
CPC .......... B60J 5/0484; B60J 5/04; B60J 5/0468; B60N 2/015; B60N 2/01508; B60N 2/3009; B60N 2/36; B60N 2/366; B60N 2/90
USPC ........... 296/29, 191, 146.5, 65.09, 65.16, 69
See application file for complete search history.

(56) References Cited

U.S. PATENT DOCUMENTS

| | | | | |
|---|---|---|---|---|
| 5,937,498 A | * | 8/1999 | Ploeger | B25B 31/00 29/280 |
| 7,980,616 B2 | * | 7/2011 | Fletcher | B60N 3/101 296/64 |
| 2011/0057470 A1 | * | 3/2011 | Aoki | B60N 2/3079 296/65.01 |
| 2015/0291316 A1 | * | 10/2015 | Fietz | A47G 19/2205 220/757 |
| 2016/0023581 A1 | * | 1/2016 | Kheil | B60N 2/5891 297/452.61 |
| 2018/0133093 A1 | * | 5/2018 | Khademhosseini | A61H 3/02 |

FOREIGN PATENT DOCUMENTS

| | | | | |
|---|---|---|---|---|
| CA | 2247863 C | * | 10/2002 | ............ A47C 1/124 |
| DE | 102013205244 A1 | * | 9/2014 | ........... B22F 3/1035 |
| JP | H0462225 U | * | 5/1992 | |
| JP | H07124030 A | * | 5/1995 | |

(Continued)

OTHER PUBLICATIONS

Machine translation JP H10100763.*
Machine translation DE 102013 205244.*

*Primary Examiner* — Dennis H Pedder
*Assistant Examiner* — Kevin P Weldon
(74) *Attorney, Agent, or Firm* — Brooks Kushman P.C.

(57) ABSTRACT

A seat clamp is provided for securing a seat in a folded position and is adapted to be attached between a cargo hook in the vehicle and a seat. A clamp body is formed of plastic and has a first attachment feature along a first end, for securing the seat clamp to the cargo hook in the vehicle cargo area. A second attachment feature is formed at the second end of the clamp body for releasably securing the clamp body to a bracket on the seat with an interference fit.

17 Claims, 8 Drawing Sheets

(56) References Cited

FOREIGN PATENT DOCUMENTS

| | | | | |
|---|---|---|---|---|
| JP | H10100763 A | * | 4/1998 | |
| JP | 2007055421 A | * | 3/2007 | |
| WO | WO-2012123955 A2 | * | 9/2012 | ............. B60N 2/366 |

* cited by examiner

FOLDING SEAT CLAMP

CROSS-REFERENCE TO RELATED APPLICATIONS

This application claims the benefit of U.S. provisional application Ser. No. 63/044,774, the disclosure of which is hereby incorporated in its entirety by reference herein.

TECHNICAL FIELD

The present application relates to a removable clamp for securing a seat in a folded storage position.

BACKGROUND

Some vehicles have a back seat that can be folded down and/or flipped forward to a storage position from an upright seated position. The seat should be secured against movement in both the upright position as well as any storage position.

SUMMARY

According to one embodiment, a seat clamp is provided for securing a seat in a folded position and is adapted to be attached between a cargo hook in the vehicle and a seat. A clamp body is formed of plastic and has a first attachment feature along a first end, for securing the seat clamp to the cargo hook in the vehicle cargo area. A second attachment feature is formed at the second end of the clamp body for releasably securing the clamp body to a bracket on the seat with an interference fit.

In another embodiment, a first attachment groove is formed along a first end, the first groove extending in a first direction for attaching to the cargo hook in the vehicle cargo area. A second attachment groove is formed at the second end of the clamp body, the second groove extending in a second direction different than the first direction for attaching to a bracket on the seat.

In another embodiment, at least one of the first groove or second groove is L-shaped and forms a projection that provides retention in two directions.

In another embodiment, at least one of the first end or second end has a projection tab extending beyond the groove to provide a finger grip to facilitate removal of the seat clamp.

In another embodiment, the first end is spaced apart from second end in the first direction and second direction.

In another embodiment, the clamp body has an intermediate portion that extends between a first flange having the first attachment feature and a second flange having the second attachment feature.

In another embodiment, the intermediate portion extends at an angle between the first end and the second end to allow access to a cargo compartment between the cargo hook and the seat back.

In another embodiment, the intermediate portion is sized based on the distance between the seat bracket and the cargo hook.

In another embodiment, the intermediate portion has an enlarged surface and has an integrally formed logo along the enlarged surface.

In another embodiment, the intermediate portion has an enlarged surface being generally planar.

In another embodiment, the clamp body is formed of plastic.

In another embodiment, the clamp body is by additive manufacturing.

In another embodiment, the seat clamp has a second clamp body being a mirror image of the first clamp body.

According to at least one embodiment, an assembly for securing a seat to a pair of cargo hooks in a vehicle cargo area is provided. A first clamp body and a second clamp body are each adapted to be attached to one of the pair of cargo hooks along a first flange and adapted to be attached to one of the pair of seat brackets along a second flange. Each of the first and second clamp bodies has a first attachment groove formed along the first flange for securing the seat clamp to one cargo hook with an interference fit. Each of the clamp bodies has a second attachment groove formed along the second flange for releasably securing the clamp body to one seat bracket with an interference fit, the second attachment groove extending in a second direction different than the first direction for attaching to a bracket on the seat. The first and second clamp bodies are mirror images.

In another embodiment, the second angle is generally perpendicular to the first angle.

In another embodiment, the first and second clamp bodies have an intermediate portion that extends between the first flange and the second flange, wherein the intermediate portions of each of the first and second clamp bodies are non-parallel.

In another embodiment, the second attachments grooves are colinear when installed to the seat brackets.

In another embodiment, the first attachments grooves are spaced apart and generally parallel when installed to the cargo hooks.

In another embodiment, the first flanges are spaced apart a first distance being greater than a second distance between the second flanges to allow access to a cargo compartment between the cargo hooks and the seat back.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Some vehicles such as the two-door Jeep Wrangler have a back seat that can be in three positions: 1) upright, 2) back-folded down, and 3) completely flipped forward. When the seat is in the upright position, the seat is fully locked into place ready for passengers. When the seat is in the back-folded down or completely flipped forward, the seat is not fully secure and can move around on its front hinges while the vehicle is in motion. This can cause sudden noises, impacts with the driver's seat and/or damage to the seat or cargo. Drivers who prefer to travel with the back seat folded down must either accept this potential issue or attempt to secure the seat. The most common method is to utilize elastic bungee cords to tie the brackets on the back of the seat to the tie-down/cargo hooks located on the rear cargo floor of the vehicle. The bungee cord solution is imperfect as the bungee cord still allows for undesirable seat movement and could break under stress. Also, the bungee cord can block access to the underfloor storage systems.

The folding seat clamp 10 shown in the Figures solves these problems and provides a custom clamp to tie the aforementioned brackets together, prevent excess movement for the seat in operation, while still allowing access to the under-seat storage compartment 16 while the seat clamp 10 is in place.

The folding seat clamp 10 could be used in other vehicles or applications where a rotating, moving object with a bracket may occasionally want to be secured to a non-moving object with bracket to prevent movement. Further variations of the folding seat clamp could be used as a desirable substitute for some bungee cord applications.

Figure 1:
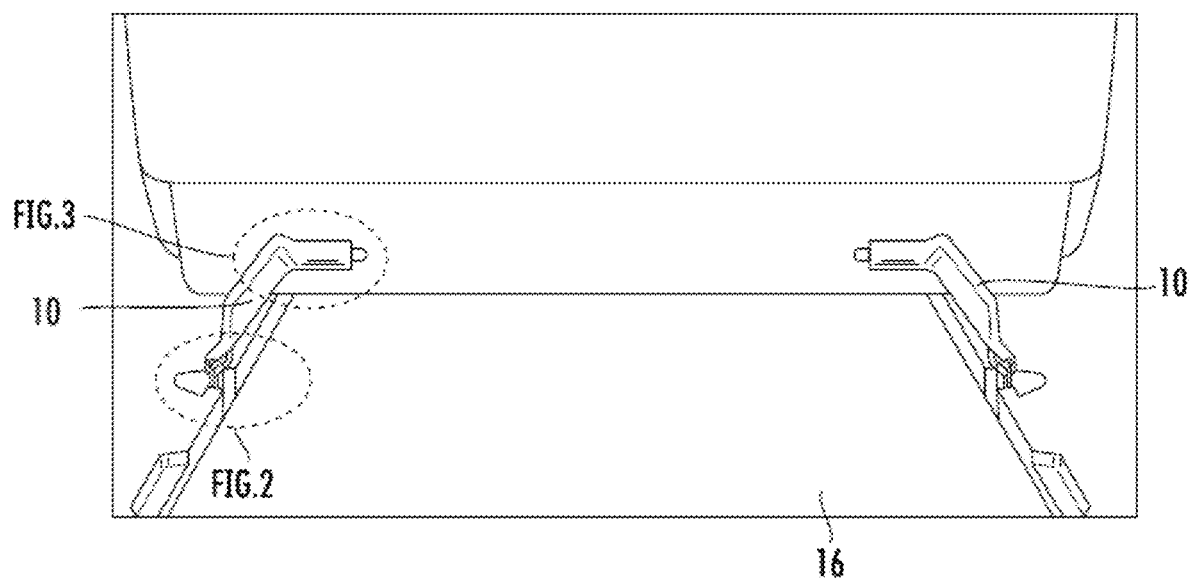
FIG. 1 shows the cargo area of a vehicle and the seat in a folded position and secured by a pair of seat clamps.

FIG. 1 illustrates the rear cargo area of a vehicle with a pair of folding seat clamps 10 securing the seat to a pair of cargo hooks 12 and seat brackets 14. Each folding seat clamp 10 is a one-piece design that secures the seat when it is in the folded-down position. As shown in FIG. 1, a system may provide a pair of seat clamps 10 that are mirror images and secure the seat to two cargo hooks 12 and two seat brackets 14. Each of the seat clamps 10 may be individually secured and fully removed to the corresponding cargo hook 12 and seat bracket 14.

The folding seat clamp 10 may be formed of a plastic or other suitable material. For example, plastic material is snug enough to give a tight, firm fit, but compliant enough to compensate for minor variations in the true position of the two separate brackets and separate cargo hooks. In one example, the seat clamp 10 may be formed with 3D printing or additive manufacturing. Alternatively, the seat clamp 10 may be molded of plastic, or formed of other suitable materials and processes.

The body of the seat clamp 10 has a first attachment feature 20 along a first end 22 for securing the seat clamp to the cargo hook 12 in the vehicle cargo area. A second attachment feature 26 is formed at the second end 28 of the seat clamp 10 for releasably securing the seat clamp 10 to a bracket on the seat.

Figure 2:
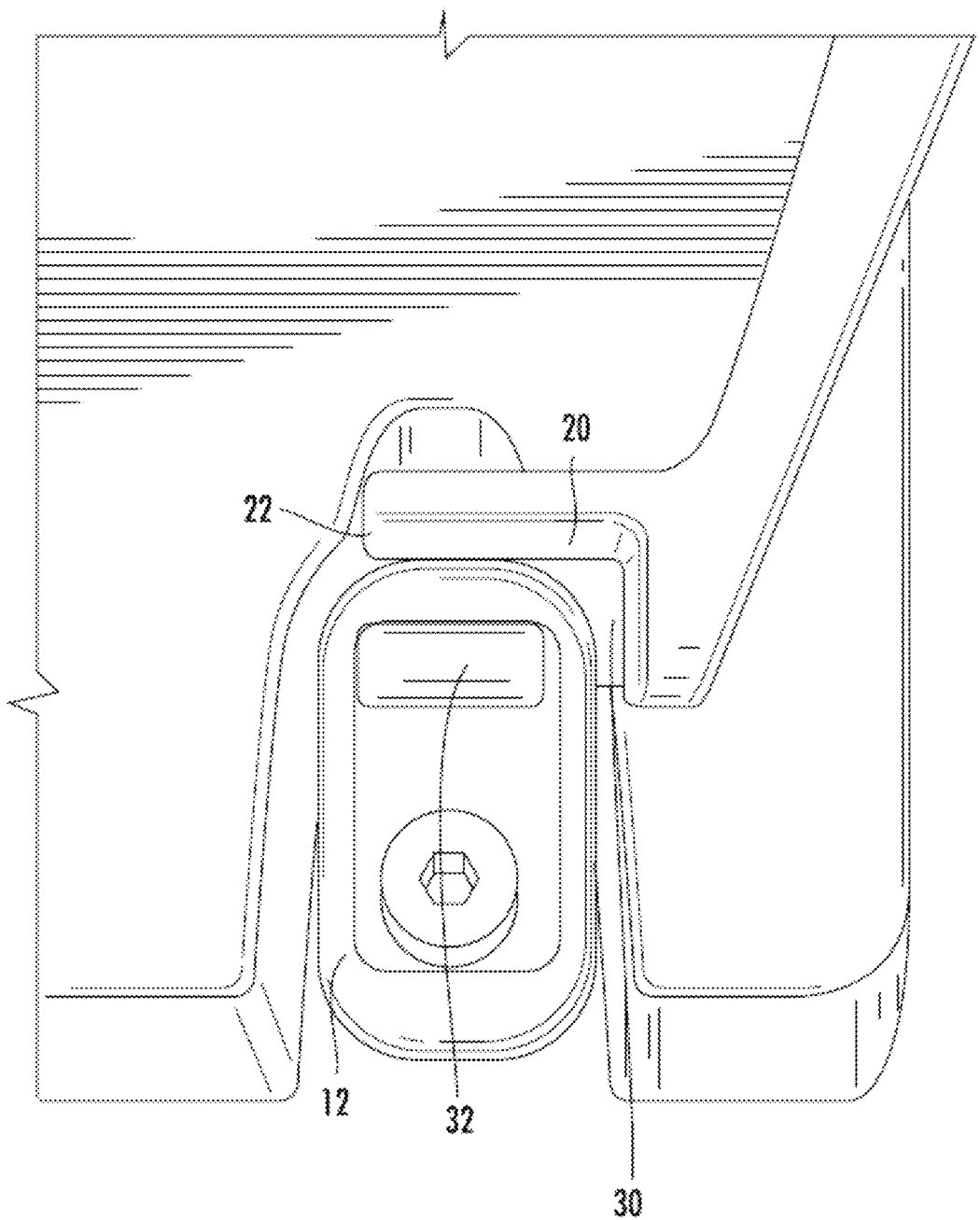
FIG. 2 shows the seat clamp of FIG. 1 in more detail where a first end of the seat clamp is secured to a cargo hook.

FIG. 2 illustrates the cargo hook portion of the folding seat clamp 10 in greater detail. The first attachment feature 20 has a groove sized to be secured to the fixed cargo hook 12 in the vehicle, such as on the cargo area of the floor. The first groove 30 is secured to the cargo hook 12 with an interference fit, such as a snap fit. The groove 30 snaps into engagement with the cargo hook 12 located in the floor of the vehicle. The groove 30 may be shaped to cooperate with the cargo hook 12. As shown in FIG. 2, the groove 30 extends linearly to snap into a top-bar of the cargo hook 12. The groove 30 may also be an L-shaped groove that snaps into engagement with a side-bar of the cargo hook 12. The L-shaped groove 30 forms a projection 32 that abuts the side bar and provides retention in two directions to prevent the first end 22 of the seat clamp 10 from sliding out of engagement with the cargo hook 12 as the seat clamp 10 is attached to the seat at the second end 28. The first attachment feature 20 may be any suitable shape to mate with the shape and configuration of the cargo hook 12.

Figure 3:
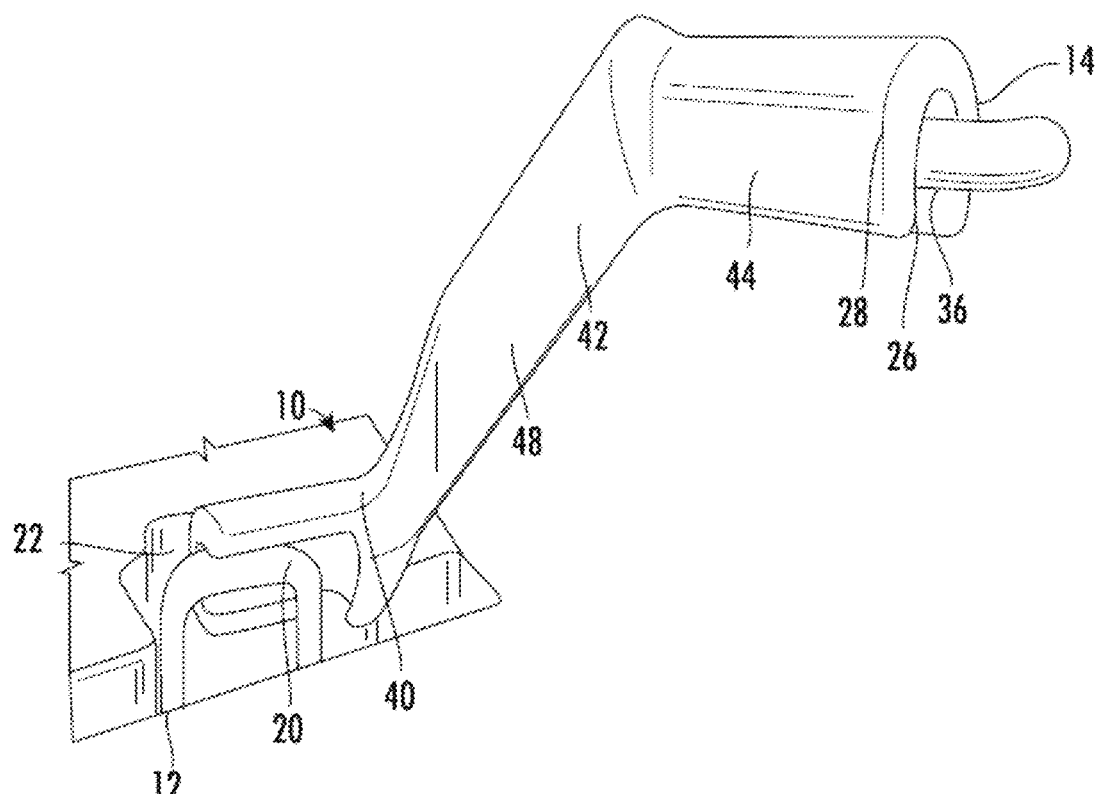
FIG. 3 shows a side perspective view of the seat clamp in FIG. 1 showing in more detail a second end of the seat clamp secured to a seat bracket and the first end secured to the cargo hook.

FIG. 3 illustrates the seat bracket portion of the folding seat clamp 10 in greater detail. The second attachment feature 26 has a second groove 36 sized to be secured to a fixed seat bracket 14 in the vehicle. The second groove 36 is secured to the seat bracket 14 with an interference fit, such as a snap fit. The second groove 36 may also have an L-shaped projection to snap into engagement with a side-bar of the seat bracket 14 to provide retention in two directions at the second end 28.

The seat clamp 10 includes an intermediate portion 42 that extends between the attachment features 20, 26 on the first end 22 and the second end 28. Each of the first and second ends 20, 26 include a flange 40, 44 that projects from the intermediate portion 42. As illustrated, the intermediate portion 42 is angled between the first and second flanges 40, 44. The intermediate portion 42 is sized based on the distance between the seat bracket 14 and the cargo hook 12. The attachment features 20, 26, such as the first and second grooves 30, 36, are formed along the flanges 40, 44.

The cargo hook 12 and the seat bracket 14 may be oriented at angles relative to each other that are not parallel spaced apart within the vehicle. As shown in FIG. 1, the cargo hooks 12 are spaced apart at least by a width of the under-seat storage compartment 16. The seat clamp 10 allows the cargo hook 12 and the seat bracket 14 to be easily and securely attached to each other, even though they are oriented at different angles. As illustrated in FIG. 3, a first flange 40 extends from the intermediate portion 42 in a first direction for attaching to the cargo hook 12 in the vehicle cargo area while a second flange 44 extends in a second direction different than the first direction.

The intermediate portion 42 has an enlarged surface 46. The surface 46 may be generally planar. As shown in FIG. 3, a logo 48 or other indicia may be formed along the enlarged surface 46. The indicia 48 may be integrally formed by injection molding or additive manufacturing, for example.

Figure 4:
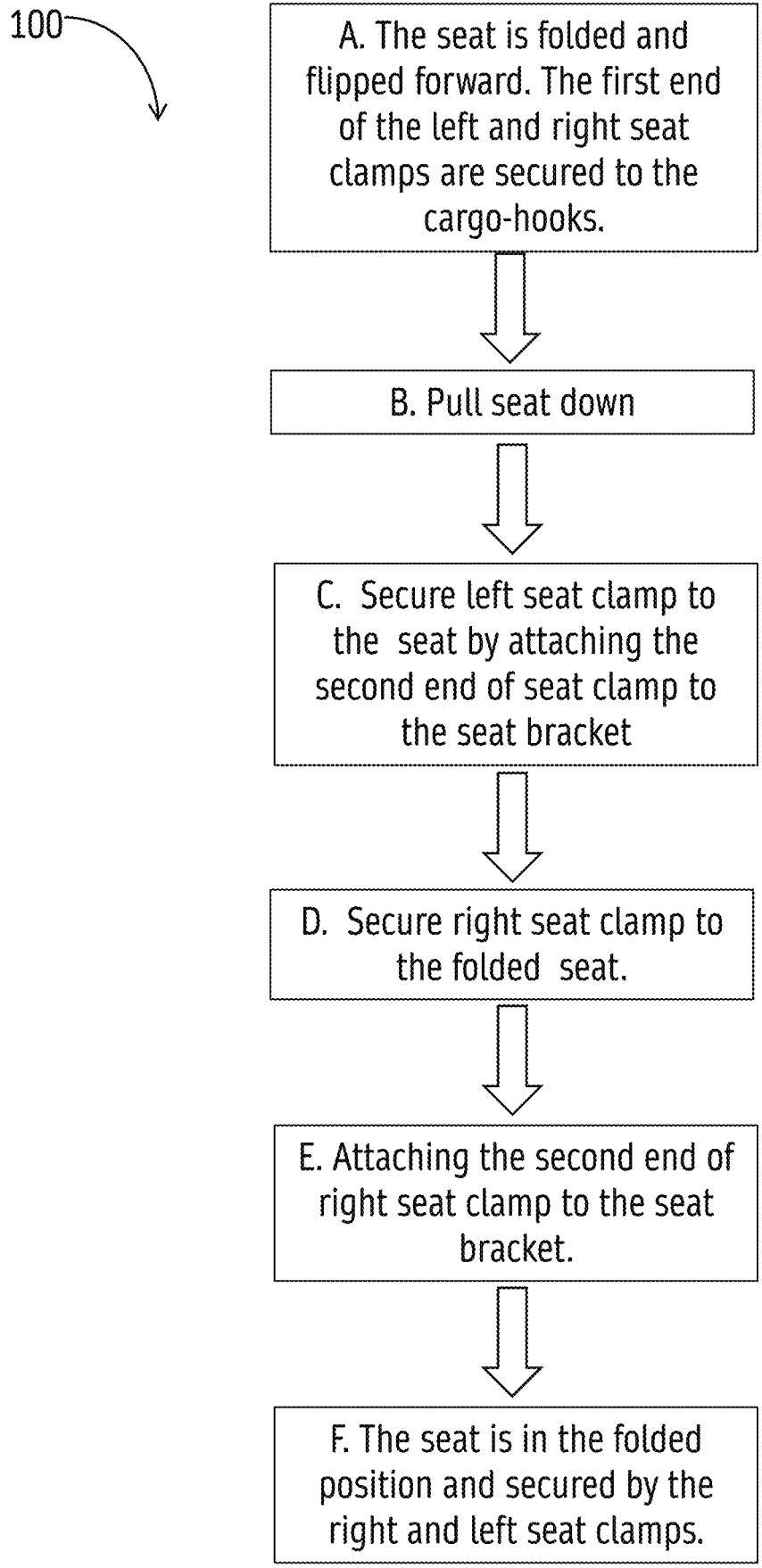
FIG. 4 illustrates a flowchart of the pair of seat clamps being installed in a vehicle to secure a seat in the folded position.

FIG. 4 shows the method 100 of the pair of seat clamps 10 being installed in a vehicle to secure a seat in the folded position. In step A the seat is folded and flipped forward. The first end 22 of the left and right seat clamps 10 are already secured to the cargo hooks 12. In step B a user pulls the seat down to the folded position. In step C a user secures the left seat clamp 10 to the seat by attaching the second end 28 of seat clamp 10 to the seat bracket 14.

In step D the user secures the right seat clamp 10 to the folded seat. In step E the user attaches the second end 28 of right seat clamp 10 to the seat bracket 14. Step F shows the seat is in the folded position and secured by the right and left seat clamps 10.

Figure 5:
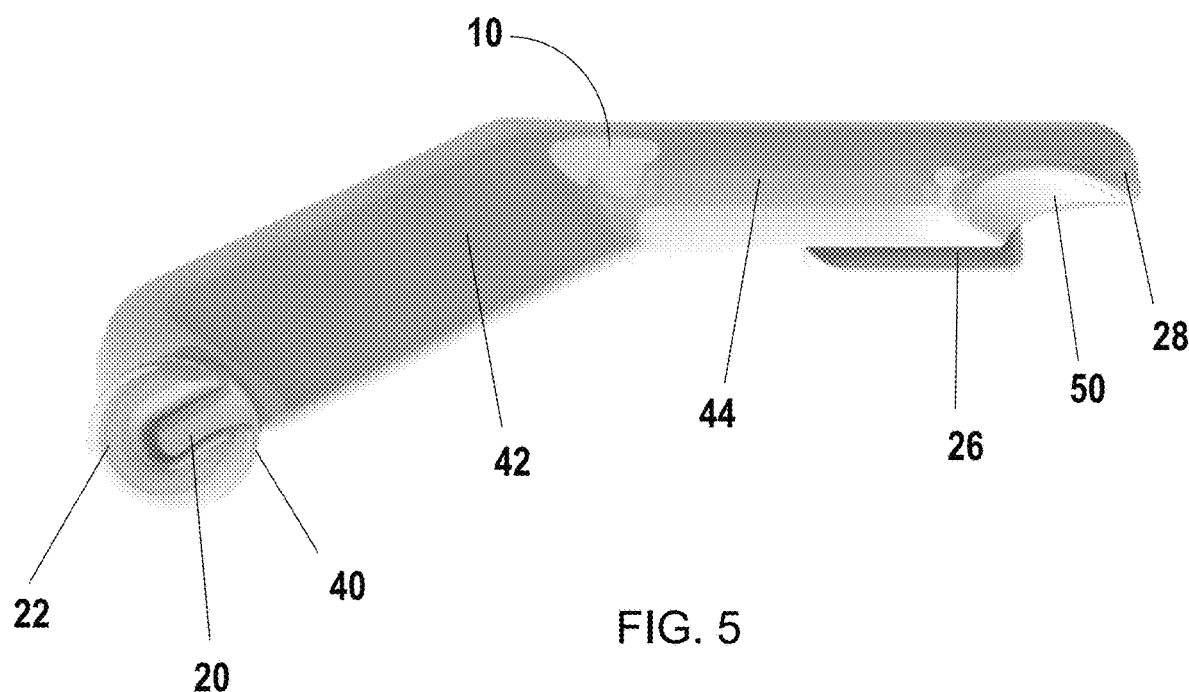
FIG. 5 shows a seat clamp in more detail according to another embodiment.

FIG. 5 shows a seat clamp 50 having a projection tab 52 extending beyond the attachment feature 26. The projection tab 52 provides a finger grip to facilitate removal of the seat clamp 50 from the seat bracket 14. The projection tab 52 may be contoured for a user to easily grip with their fingers or have any suitable shape or sized projection to allow the user to have leverage for disengaging the inference fit between the seat clamp 50 and cargo hook 12 and seat bracket 14. In another embodiment, a projection tab may also be formed along a first end 22.

Figure 6:
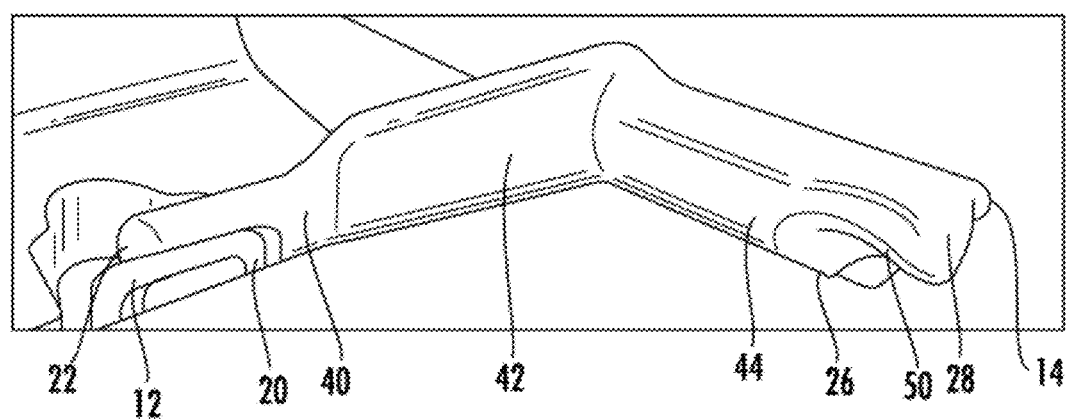
FIG. 6 shows a front perspective view of the seat clamp in FIG. 5 installed to secure the seat in the folded position.

FIG. 6 shows the seat clamp 50 installed to secure the seat in the folded position.

Figure 7:
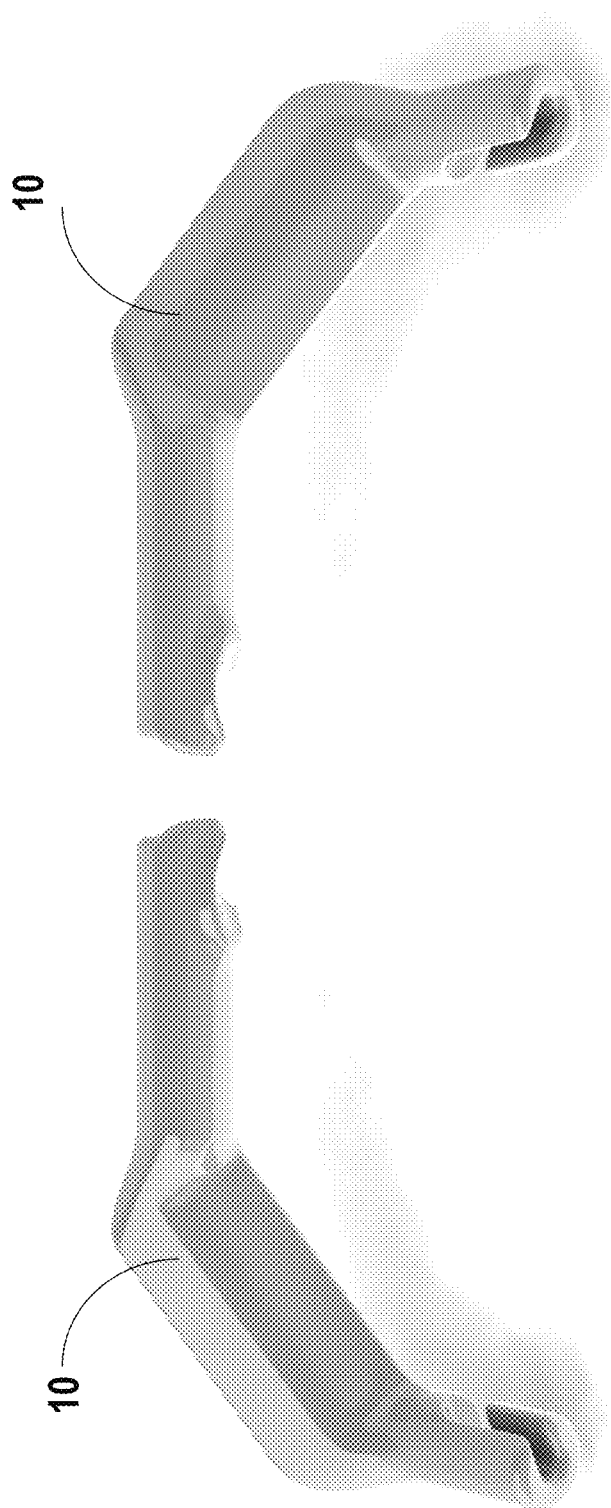
FIG. 7 shows a front perspective view of a pair of seat clamps removed from the vehicle and seat.
Figure 8:
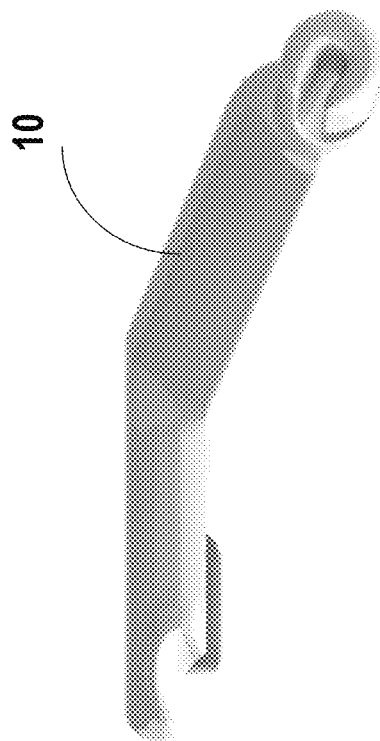
FIG. 8 shows a side perspective view of the pair of seat clamps in FIG. 7.
Figure 8:
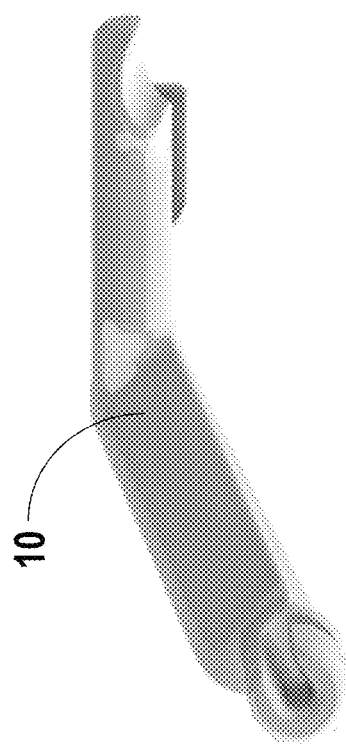
Figure 9:
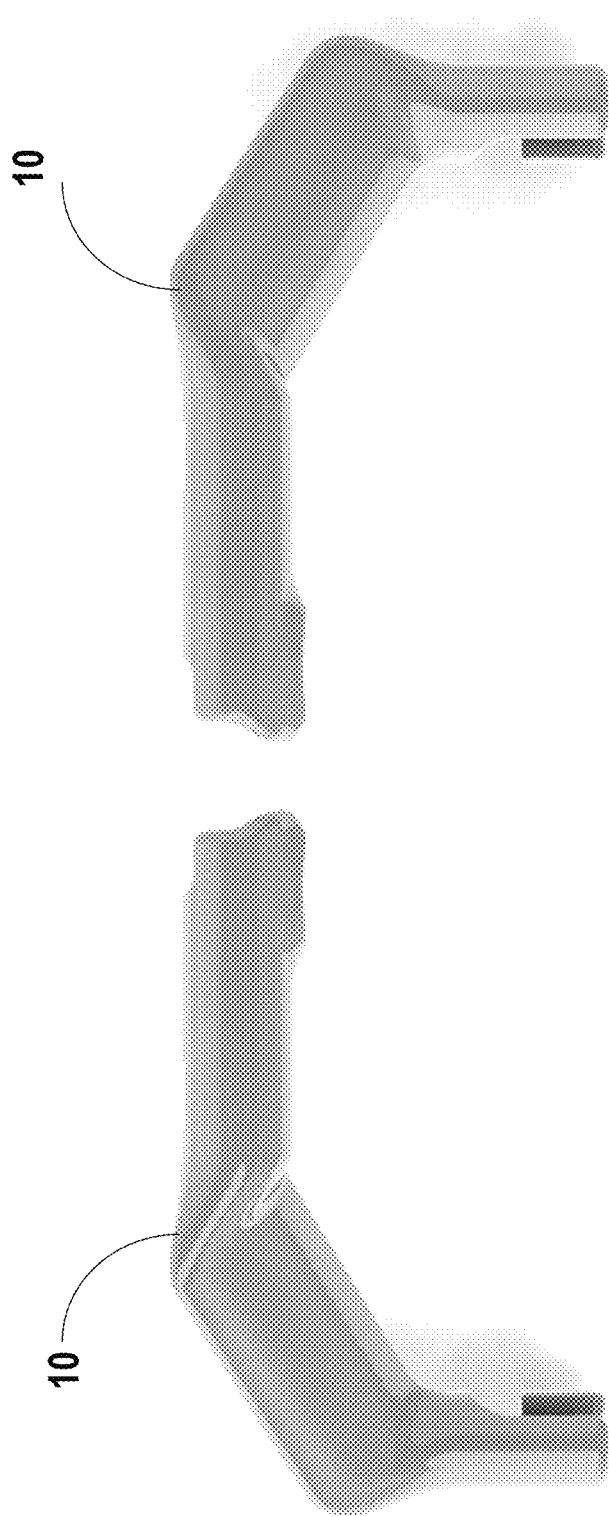
FIG. 9 shows a top perspective view of the pair of seat clamps in FIG. 7.

FIGS. 7-9 show a pair of seat clamps 50 removed from the vehicle and seat. As shown, the seat clamps 50 are a mirror-image of each other.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat clamp for securing a seat to a cargo hook in a vehicle cargo area, the seat clamp comprising:
   clamp body is adapted to be attached to the cargo hook at a first end and a seat bracket at a second end,
   a first attachment feature formed along the first end of the clamp body for securing the seat clamp to the cargo hook in the vehicle cargo area,
   a second attachment feature formed at the second end of the clamp body for releasably securing the clamp body to a bracket on the seat with an interference fit,
   wherein the first attachment feature comprises a first groove extending in a first direction for attaching to the cargo hook in the vehicle cargo area, and the second attachment feature comprises a second attachment groove extending in a second direction different than the first direction for attaching to a bracket on the seat,
   wherein at least one of the first groove or second groove is L-shaped and forms a projection that provides retention in two directions.

2. The seat clamp of claim 1, wherein at least one of the first end or second end has a projection tab extending beyond the groove to provide a finger grip to facilitate removal of the seat clamp.

3. The seat clamp of claim 1, wherein the first end is spaced apart from second end in the first direction and second direction.

4. The seat clamp of claim 3, wherein the clamp body further comprises an intermediate portion, wherein the intermediate portion extends between a first flange having the first attachment feature and a second flange having the second attachment feature.

5. The seat clamp of claim 4, wherein the intermediate portion extends at an angle between the first end and the second end.

6. The seat clamp of claim 4, wherein the intermediate portion has an enlarged surface and has an integrally formed logo along the enlarged surface.

7. The seat clamp of claim 4, wherein the intermediate portion has an enlarged surface being generally planar.

8. The seat clamp of claim 1, wherein the clamp body is formed of plastic.

9. The seat clamp of claim 1, wherein the clamp body is formed by additive manufacturing.

10. The seat clamp of claim 1, further comprising a second clamp body being a mirror image of the first clamp body.

11. An assembly for securing a seat to a pair of cargo hooks in a vehicle cargo area, the assembly comprising:
    a first clamp body; and
    a second clamp body, wherein each of the first clamp body and the second clamp body is adapted to be attached to one of the pair of the cargo hooks along a first flange and adapted to be attached the seat along a second flange,
    wherein each of the first clamp body and the second clamp body has:
    a first attachment groove formed along the first flange for securing the seat clamp to the cargo hook with an interference fit,
    a second attachment groove formed along the second flange for releasably securing the clamp body to a seat bracket with an interference fit, the second attachment groove extending in a second direction different than a first direction for attaching to a bracket on the seat,
    wherein the first clamp body and the second clamp body are mirror images.

12. The assembly of claim 11, wherein the first attachment groove is spaced apart from the second attachment groove in the first direction and second direction.

13. The assembly of claim 11, wherein the second angle is generally perpendicular to the first angle.

14. The assembly of claim 11, wherein the first and second clamp bodies have an intermediate portion that extends between the first flange and the second flange, wherein the intermediate portions of each of the first and second clamp bodies are non- parallel.

15. The assembly of claim 11, wherein the second attachments grooves are colinear when installed to the seat brackets.

16. The assembly of claim 11, wherein the first attachments grooves are spaced apart and generally parallel when installed to the cargo hooks.

17. The assembly of claim 11, wherein the first flanges are spaced apart a first distance being greater than a second distance between the second flanges to allow access to a cargo compartment between the cargo hooks and the seat back.

* * * * *